United States Patent
Tao et al.

(10) Patent No.: US 7,474,676 B2
(45) Date of Patent: Jan. 6, 2009

(54) FRAME AGGREGATION IN WIRELESS COMMUNICATIONS NETWORKS

(75) Inventors: Zhifeng Tao, Brooklyn, NY (US);
Daqing Gu, Burlington, MA (US);
Yukimasa Nagai, Kanagawa (JP)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 640 days.

(21) Appl. No.: 10/939,210

(22) Filed: Sep. 10, 2004

(65) Prior Publication Data
US 2006/0056443 A1 Mar. 16, 2006

(51) Int. Cl.
*H04J 3/16* (2006.01)
(52) U.S. Cl. .................................... 370/469; 709/223
(58) Field of Classification Search .................. None
See application file for complete search history.

(56) References Cited

U.S. PATENT DOCUMENTS

| | | | |
|---|---|---|---|
| 2003/0135797 A1* | 7/2003 | Choi | 714/704 |
| 2003/0152058 A1* | 8/2003 | Cimini et al. | 370/338 |
| 2003/0169769 A1 | 9/2003 | Ho et al. | 370/473 |
| 2005/0114489 A1* | 5/2005 | Yonge et al. | 709/223 |
| 2006/0029099 A1* | 2/2006 | Jang et al. | 370/473 |
| 2006/0056362 A1* | 3/2006 | Jang et al. | 370/336 |
| 2007/0112972 A1* | 5/2007 | Yonge et al. | 709/231 |
| 2007/0291793 A1* | 12/2007 | Jang et al. | 370/473 |

* cited by examiner

*Primary Examiner*—Chi H. Pham
*Assistant Examiner*—Phuc Tran
(74) *Attorney, Agent, or Firm*—Dirk Brinkman; Gene Vinokur

(57) ABSTRACT

A method aggregates frames to be transmitted over a channel in a wireless network into a single frame. Multiple MSDU frames having identical destination addresses and identical traffic classes, received in the media access control layer from the logical link layer in a transmitting station are aggregated into a single aggregate MPDU frame, which can be transmitted on the channel to a receiving station. In addition, aggregate MSDU frames with different destination addresses and different traffic classes received from the media access control layer can be further aggregated into a single aggregate PPDU frame before transmission.

17 Claims, 21 Drawing Sheets

100

300

400

500

600

700

1100

1200

1500

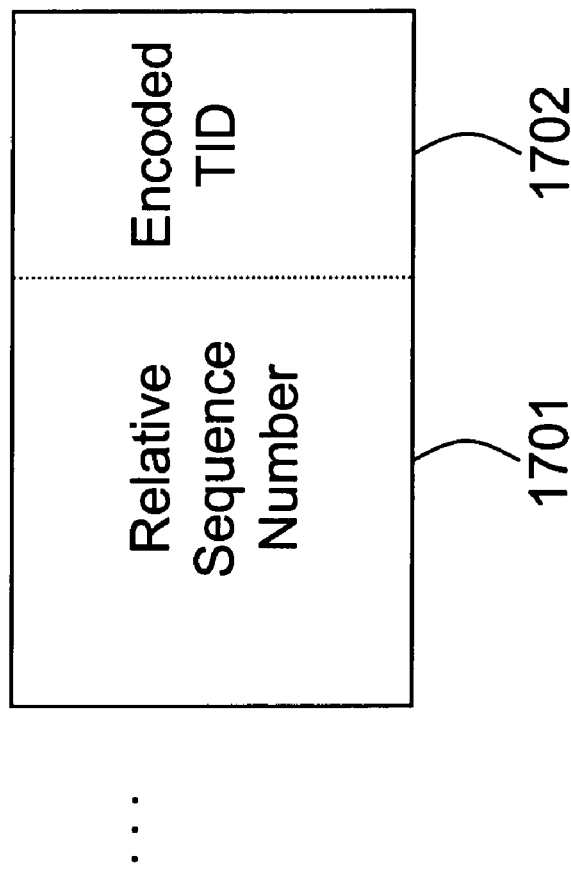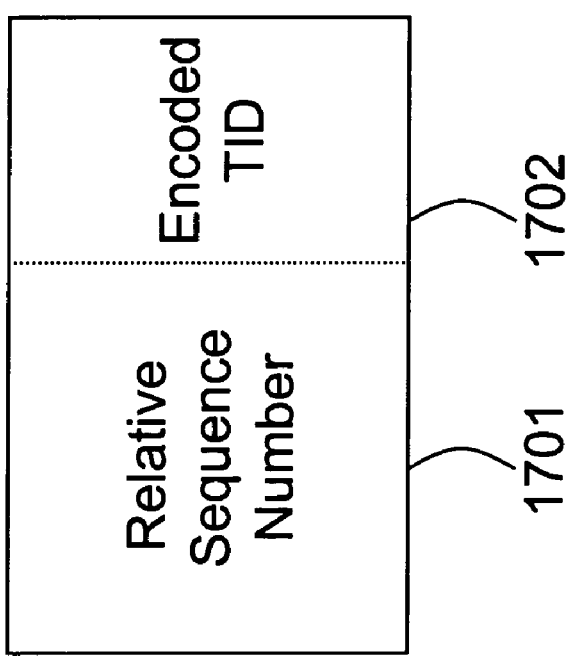
Fig. 17
1700

1800

1900

FRAME AGGREGATION IN WIRELESS COMMUNICATIONS NETWORKS

FIELD OF THE INVENTION

This invention relates generally to wireless communications networks, and more particularly to aggregating frames in such networks.

BACKGROUND OF THE INVENTION

Recent advances in the fields of wireless communications, smart antennas, digital signal processing, and VLSI make it possible to provide a very high data rate channel at a physical layer of a wireless communications network. These technologies offer at least an-order-of-magnitude larger data rate than is currently available.

The open system interconnection (OSI) model defines the application, presentation, session, transport, network, data link, and physical layers. The data link layer includes a logical link control (LLC) layer and a media access control layer. The MAC layer controls how to gain access to the network, and the LLC layer controls frame synchronization, flow control and error checking. The physical layer transmits signals over the network. The invention is concerned with the data link and physical layers.

The "IEEE 802.11n PAR: Draft Amendment to STANDARD for Information Technology-Telecommunications and information exchange between systems-Local and Metropolitan networks-Specific requirements-Part 11: Wireless LAN Medium Access Control (MAC) and Physical Layer (PHY) specifications: Enhancements for Higher Throughput" specifies data rates up to 100 Mbps at the MAC layer. The "IEEE P802.15.SG3a PAR: amendment to Standard for Telecommunications and Information Exchange Between Systems—LAN/MAN Specific Requirements: Higher Speed Physical Layer Extension for the High Rate Wireless Personal Area Networks (WPAN)" specifies data rates of 110 Mbps or higher based on ultra-wideband (UWB) communications for personal area networks (PAN).

However, to deliver 100 Mbps throughput above the MAC service access point (SAP), a pure physical layer solution is insufficient, due to a substantial protocol overhead caused by the current protocol for the MAC layer. Therefore, the current MAC layer protocol must be improved to support a higher bandwidth.

Frame Formation

As shown in FIG. 1 for a transmitter 100 in a wireless local area networks (WLAN) designed according to the IEEE 802.11 standard, each MAC service data unit (MSDU) or frame 111, received from a logic link control layer (LLC) 110, is appended with a MAC header and a frame check sequence (FCS) trailer, at the MAC layer 120, to form a MAC layer protocol data unit (MPDU) or frame 121. At the physical layer, the MPDU is received as a physical layer service data unit (PSDU) or frame 122. At the physical layer 130, a physical layer convergence procedure (PLCP) header, a PLCP preamble, and tail and pad bits are attached to the PSDU frame 122 to form a physical layer protocol data unit (PPDU) or frame 131 for transmission on the channel.

FIG. 2 shows a format 200 for the MPDU frame 121 at the media access control (MAC) layer 120, and FIG. 3 shows a format 300 of the PPDU frame 131 at the physical (PHY) layer 130. The PPDU frame includes PLCP preamble 311, signal 312, and data fields 313. The details of the other fields in these formats are specified in the standard documents.

Frame Transmission

Networks designed according to the IEEE 802.11 standard utilize a distributed coordination function (DCF), and a point coordination function (PCF) to regulate channel access. The DCF applies in both infrastructure and ad-hoc modes and follows the well-known MAC paradigm of CSMA/CA. Before each packet transmission, a transmitting station senses the channel and waits until the channel becomes idle. Then, the station defers for a time interval of DCF inter-frame space (DIFS), enters a backoff stage, and determines a random time interval called backoff-time. The backoff-time is uniformly distributed between zero and contention window (CW) size. After the backoff timer expires, only one frame is transmitted over the channel, followed by an ACK message from the receiving station. Frames that are broadcast to all stations are not acknowledged. To reduce the probability of collisions, the size of the CW is increased after each perceived collision, until a maximum CW value is reached. The CW is reset to a fixed minimum value after a successful transmission of a frame.

Bandwidth is a scarce resource in a wireless network. For a high throughput WLAN according to the IEEE 802.11n standard requirement, the MAC protocol must achieve an efficiency of 70-80% to meet the design requirement of a bit rate of 100 Mbps at the MAC service access point (SAP). The overhead associated with frame transmission according to the current IEEE 802.11 standard wastes bandwidth. If each frame is acknowledged individually, then the following items represent significant overheads for a frame transmission: the MAC header, the physical layer header (PLCP header), the PLCP preamble, the backoff, the DIFS time, the SIFS time, and the ACK message.

It is desired to reduce this overhead so that the usable bandwidth on a wireless channel can be increased.

SUMMARY OF THE INVENTION

The future IEEE 802.11n standard requires that a throughput of 100 Mbps at the MAC SAP. Various mechanisms in the current IEEE 802.11 and IEEE 802.11e MAC protocols have substantial overheads that result in bandwidth reduction.

Therefore, direct application of the current MAC protocol on the IEEE 802.11n standard is not possible unless the efficiency of the protocol is increased significantly.

The invention provides a method for aggregating MAC service data units (MSDU) and physical service data units (PSDU). The frame aggregation method according to the invention achieves a substantial improvement in throughput, without increasing the complexity of the protocol.

BRIEF DESCRIPTION OF THE DRAWINGS

FIG. 17 is a block diagram of a BlockACK bitmap field according to the invention;

DETAILED DESCRIPTION OF THE PREFERRED EMBODIMENT

The invention provides a method and system for aggregating frames in a wireless communications network. The aggregation can occur at two levels, namely the MSDU level in a MAC layer, and the PSDU level in a PHY layer. At the MSDU level, frames with identical destination address and traffic classes are aggregated into a single MPDU. MPDU frames with different destination addresses are aggregated at the PSDU level, sharing a single PLCP preamble. Thus, excessive overheads at both MSDU level, e.g., a MAC header for each MSDU, and at the PSDU level, e.g., a PLCP preamble, are reduced to the greatest extent and the throughput is then increased significantly. The way in which aggregation at the PSDU level is performed, as described above, also leads to a solution for frames that are subject to internal collisions encountered in systems designed according to the current IEEE 802.11e standard. The aggregation can be at either level or at both levels depending on the application and traffic requirements. The frame aggregation can operate during the contention and contention free periods. In addition, the invention also provides a method for acknowledging an aggregate frame.

Figure 20:
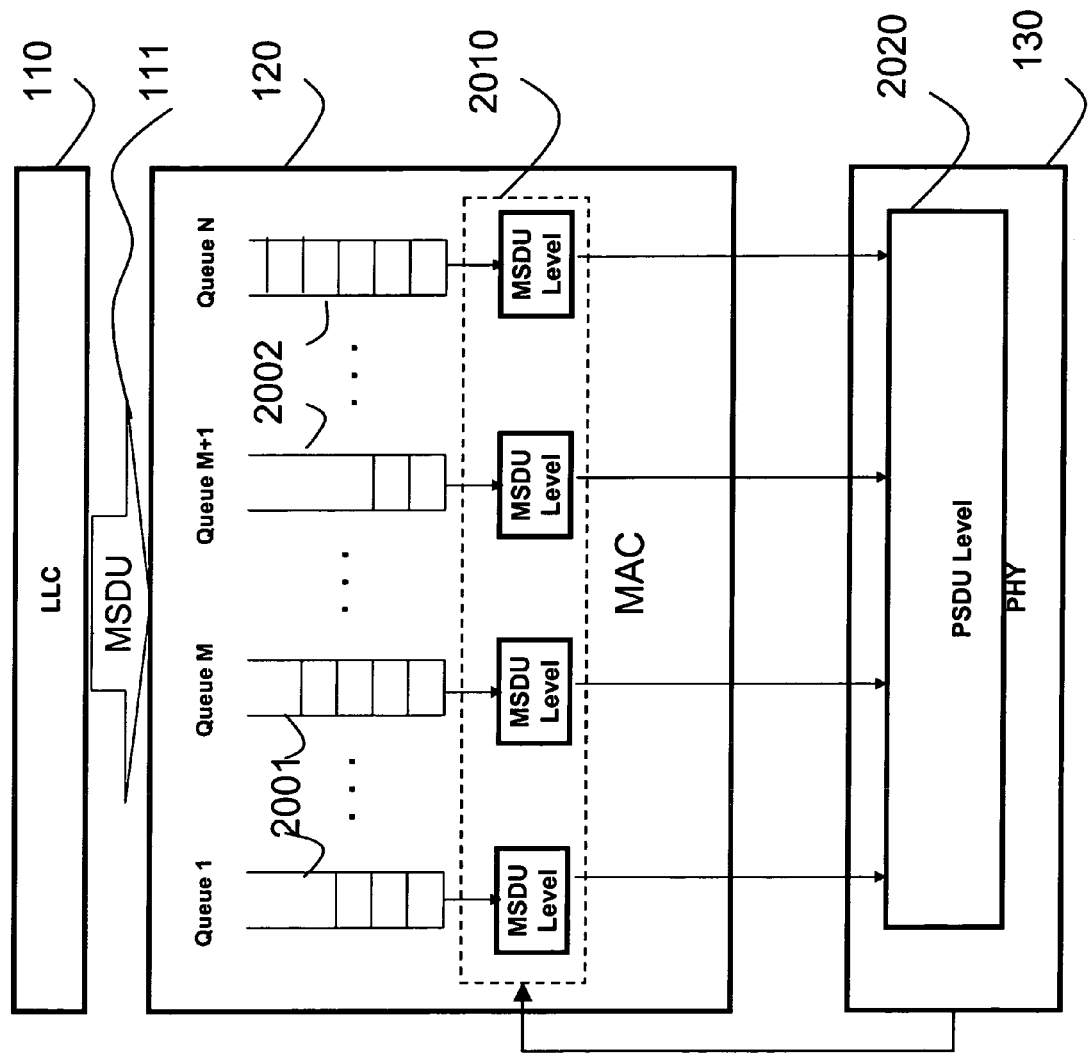
FIG. 20 is a block diagram of a transmitting station according to the invention.

For the purpose of this description and the appended claims, the following terms are said to be well known and defined in readily available IEEE standard documents:
MSDU MAC Service Data Unit
MPDU MAC Layer Protocol Data Unit
PSDU Physical Layer Service Data Unit
FCS Frame Check Sequence
OFDM Orthogonal Frequency Division Multiplexing
PPDU Physical Layer Protocol Data Unit
Frame Aggregation—Contention Period
Aggregation at MSDU Level FIG. 20 show the transmitting station according to the invention. For MSDU frames 111 placed in queues 2001-2002 of the MAC layer 120 by the LLC 110, a decision is made whether the frames are aggregated, or not. The decision is based on the destination addresses and the traffic classes (TID) of the frames. If both the destination addresses and TIDs are identical, then the frames are aggregated into one MPDU frame.

Figure 1:
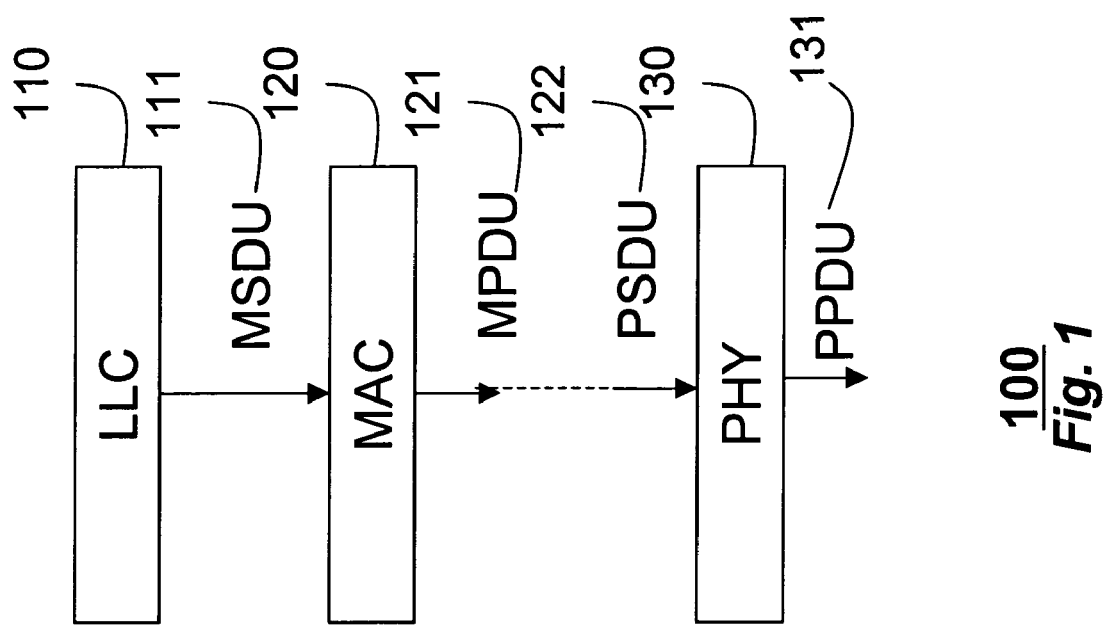
FIG. 1 is a block diagram of layers in a transmitting station of a wireless communication network according to the invention.
Figure 2:
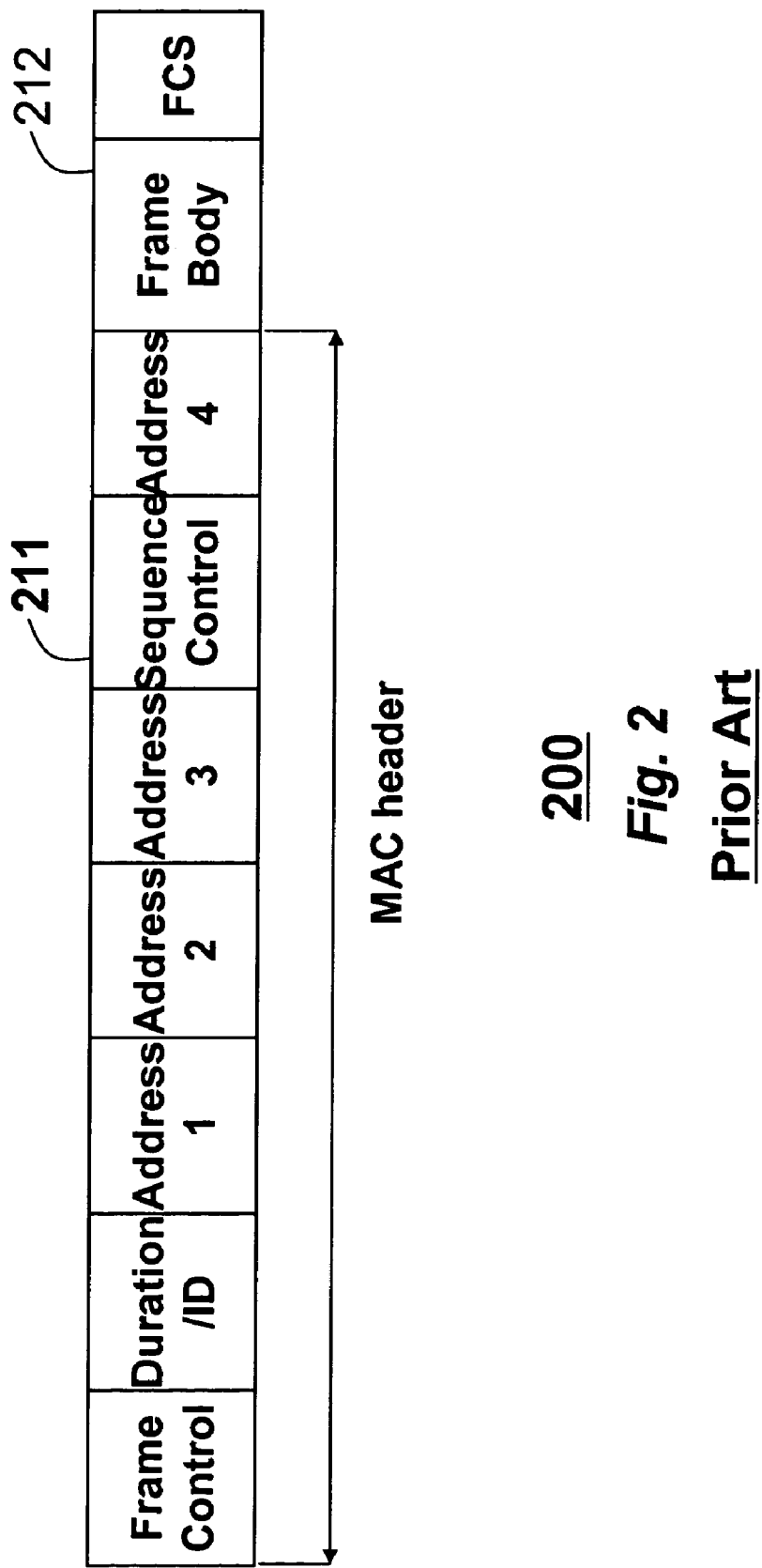
FIG. 2 is a block diagram of a prior art MPDU frame.
Figure 4:
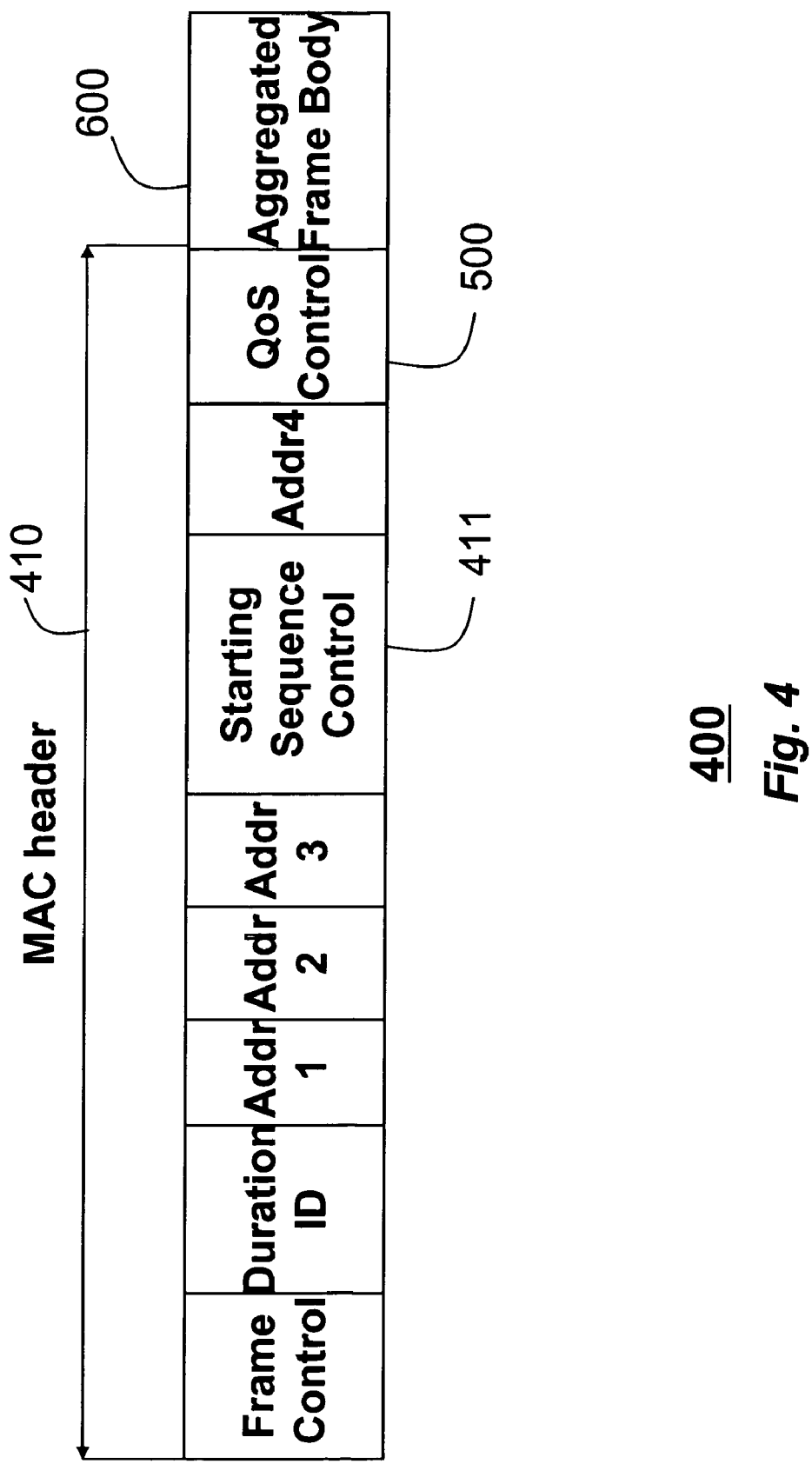
FIG. 4 is a block diagram of an aggregate MPDU frame according to the invention.

FIG. 4 shows the aggregate MPDU frame 400 according to the invention. The frame 400 includes a MAC header 410, and an aggregate frame body 600. The aggregate MPDU frame can be of any length that meets requirements of the physical layer and a corresponding transmission duration limit specified by a transmission opportunity (TXOP). The format of the MAC header 410 is specified by the IEEE 802.11e standard. However, the sequence control field 211 of the standard format 200, see FIG. 2, is now named the starting sequence control field 411. This field represents a sequence number of a first MSDU frame in the aggregate frame body field 600. The format of the starting sequence control field 411 is specified by the IEEE 802.11 standard. Because each MSDU frame in the aggregate frame body has its own FCS, there is no need to have the FCS 212 shown in FIG. 2 for the aggregate MPDU 400 according to the invention.

Figure 5:
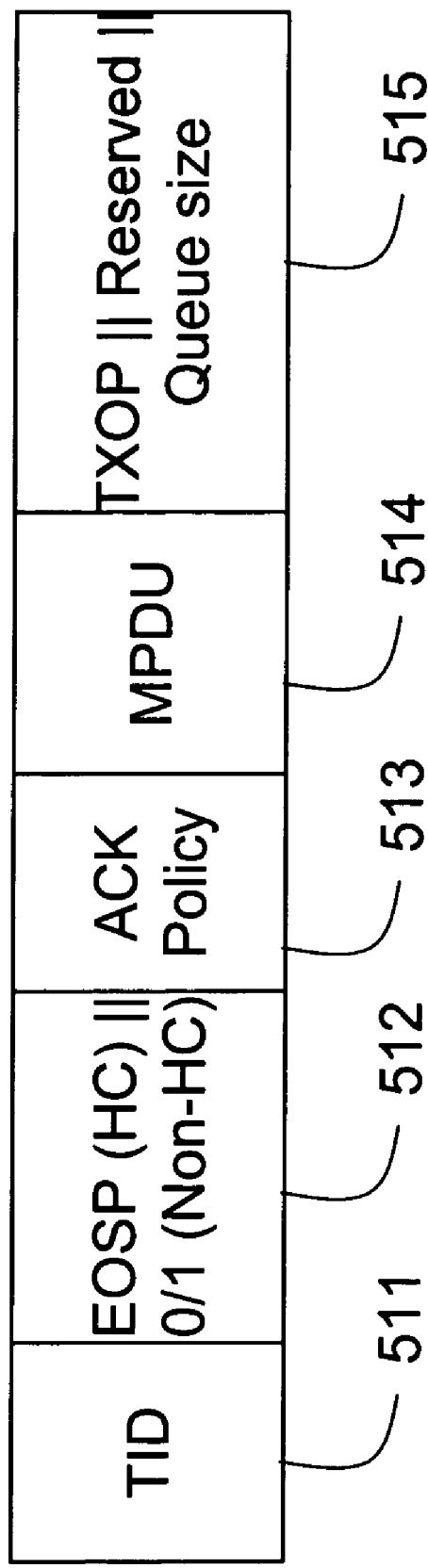
FIG. 5 is a block diagram of a QoS control field according to the invention.

The QoS control field 500 is shown in FIG. 5. This field includes the TID 511, end of service period (EOSP) 512, ACK 513, MPDU aggregation 514, and TXOP 515 fields. The MPDU field 514 is set to a one if the frame has aggregated multiple MSDUs in the body 600.

Figure 6:
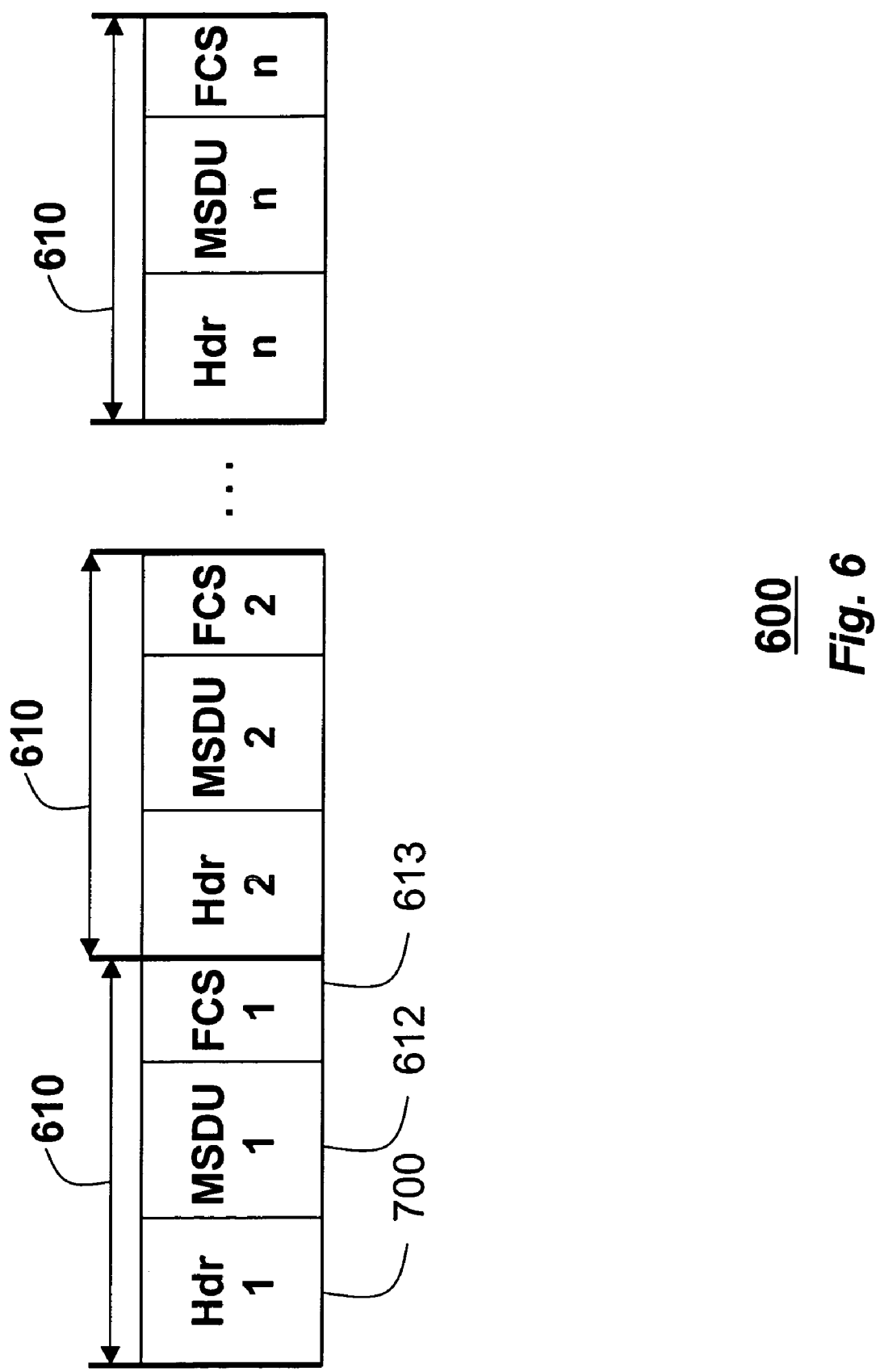
FIG. 6 is a block diagram of an aggregate frame body according to the invention.

FIG. 6 shows the format of the aggregate frame body 600 with a plurality of MSDU triplets. Each MSDU 610 triplet includes a header 700, a MSDU frame 612 and a FCS 613 for the MSDU frame. The FCS 613 is determined according to the IEEE 802.11 standard. Note that this FCS only pertains to one MSDU.

Figure 7:
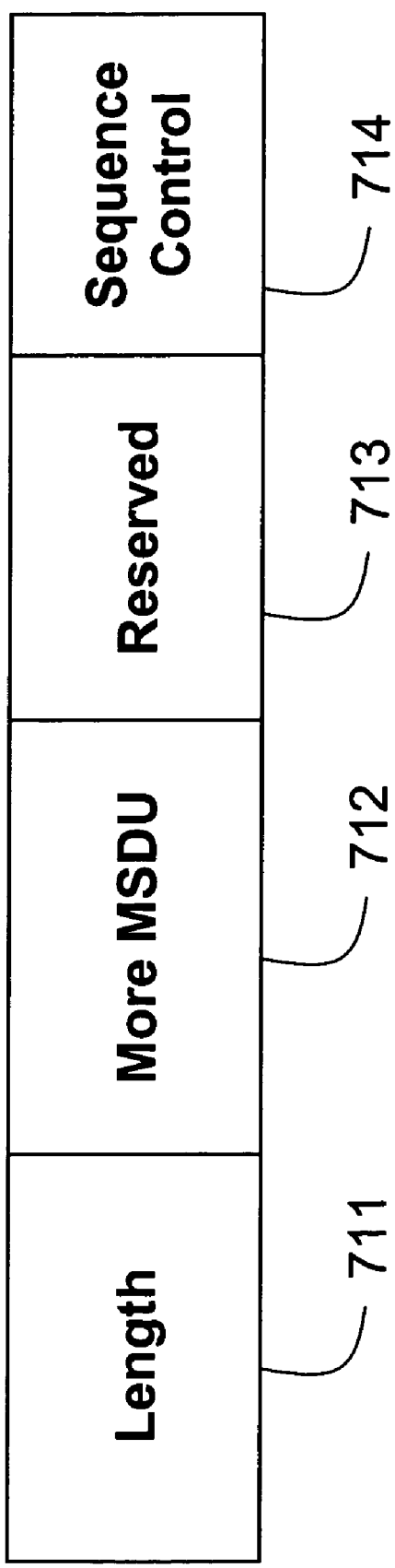
FIG. 7 is a block diagram of a header field for a MSDU in the aggregate frame body according to the invention.

FIG. 7 shows a format 700 of the header field 700, which includes length 711, more MSDU data 712, reserved 713, and sequence control 714 fields. The length field indicates the total number of bytes, up to 2048, in the immediately succeeding MSDU payload field. The one bit "more MSDU data" field 712 in the header indicates if there is a following MSDU. The sequence control is specified by the IEEE 802.11/11e standard. The sequence control is unique for each traffic TID.

Aggregation at PSDU Level

All PSDUs at the transmitting station 2000 can be aggregated, regardless of their destination addresses, or transmission rates. PSDUs of different TIDs may be qualified for aggregation, if certain conditions are met, which are described below. Each frame that is received by the MAC layer 120 from the LLC layer 110 contends for the channel according to an appropriate channel access method with a set of QoS control parameters 500 corresponding to the TID as defined by the IEEE 802.11e standard. All frames of a particular queue can be aggregated after one of the frames in that queue gains access to the channel, as long as the TXOP for that TID is honored.

According to the current standard, if backoff counters for frames of different TIDs concurrently decrement to zero, then an internal collision occurs. According to the current IEEE 802.11e standard, internal collisions are resolved by transmitting the frame with the highest priority, lower priority frames are reschedule according to a new backoff period.

In contrast, the invention aggregates all frames involved in an internal collision, as well as all frames stored in the same queue as the frame "winning" the access contention.

Figure 3:
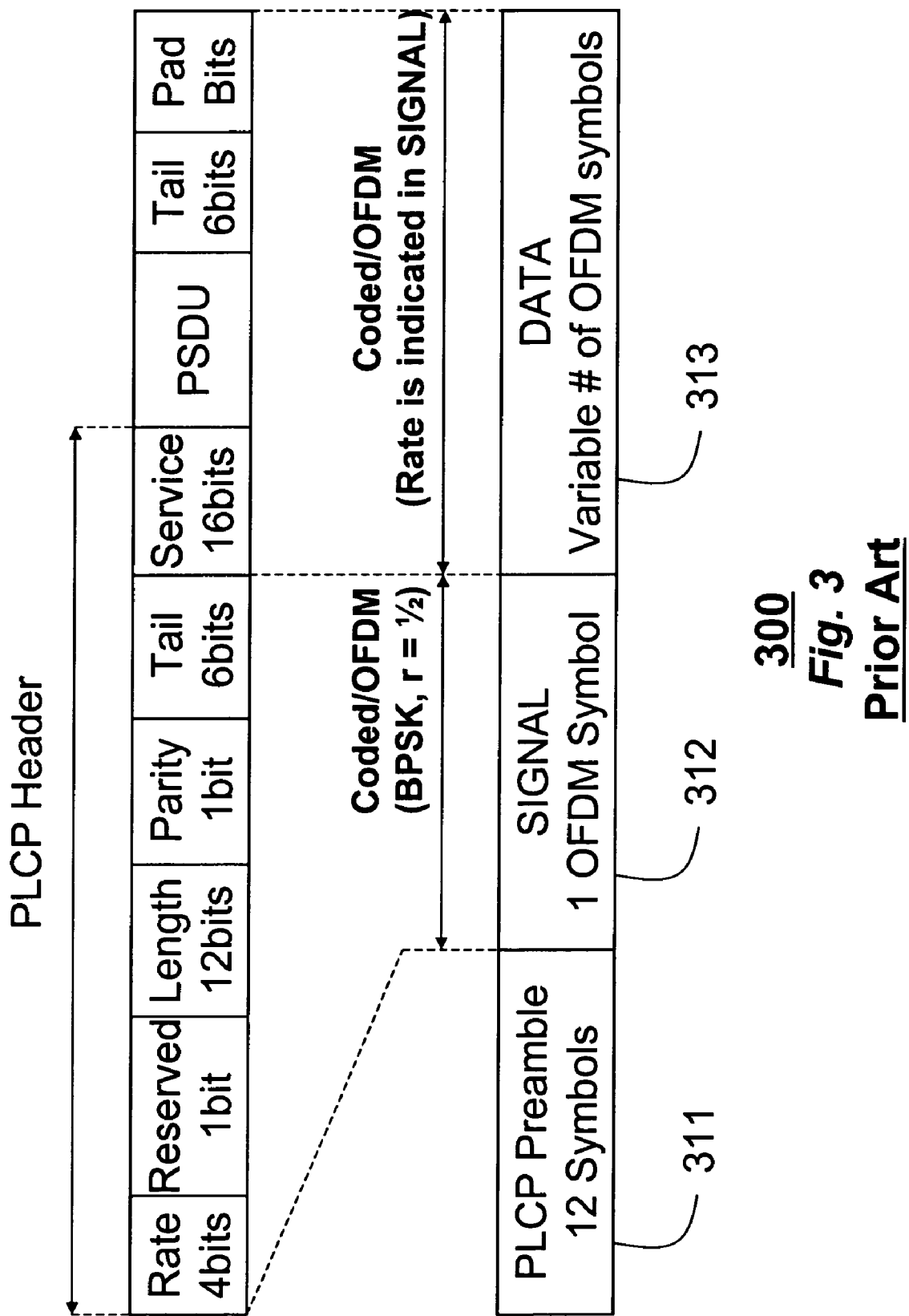
FIG. 3 is a block diagram of a prior art PPDU frame.
Figure 8:
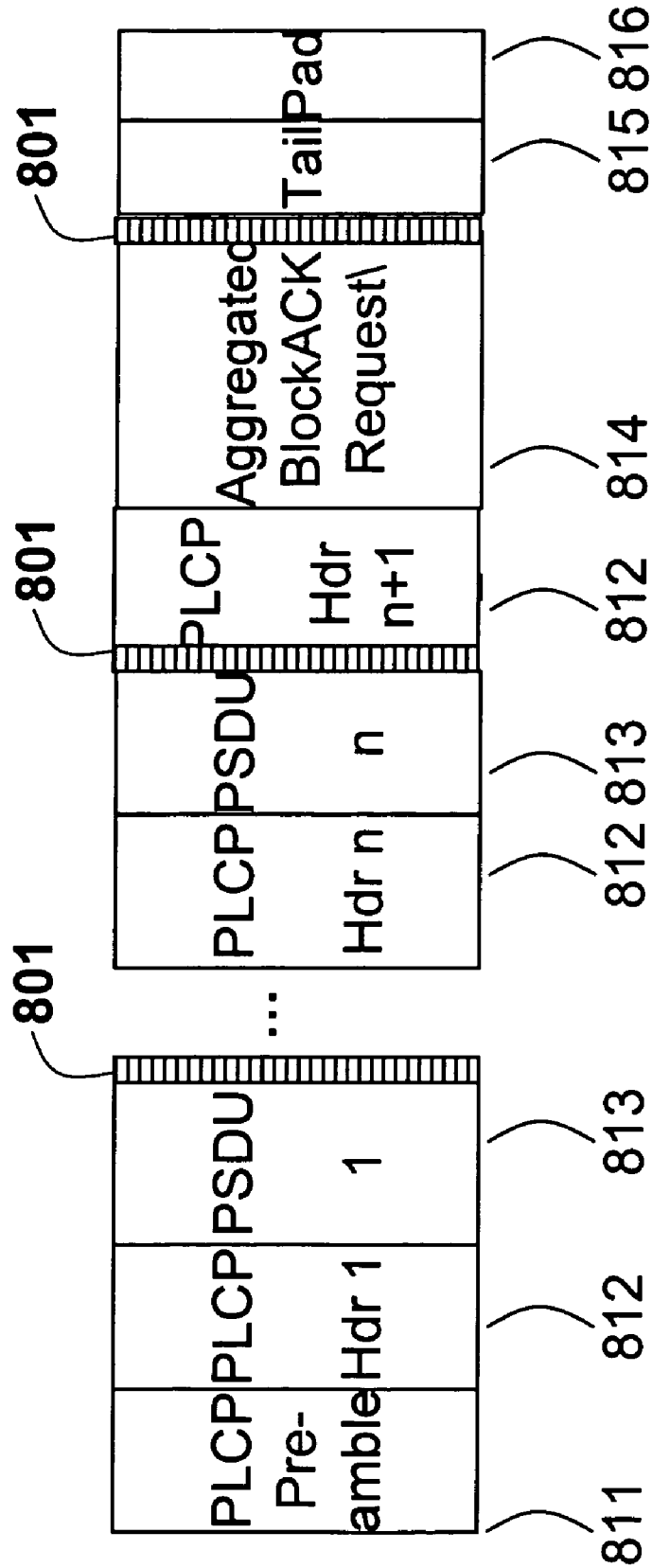
FIG. 8 is a block diagram of an aggregate PPDU according to the invention.

FIG. 8 shows a format 800 for an aggregate PPDU according to the invention, which includes PLCP preamble 811, PLCP headers 812 and corresponding PSDUs 813, aggregate block ACK request 814, tail 815, and pad 816 fields. The PLCP preamble, tail and pad are specified in the IEEE 802.11a standard, see FIG. 3.

Because each PSDU can have a different destination address, the transmission rate for the PSDU can be different than the rate for an adjacent PSDU. This is an issue that is not present in the prior art schemes.

Therefore, an OFDM symbol 801 can be inserted between the fields to enable the transmitter to make rate adjustments if rates of adjacent PSDUs are different. If the rates are the same, the OFDM symbol 801 is not required. The OFDM symbol has a unique pattern so that the receiver stations can distinguish the start of the next PLCP header 812 from the end of the previous PSDU frame 813. It should be noted that last the PSDU n, and the following PCLP header n+1 are used for acknowledgement control purpose, as described in greater detail below.

Figure 9:
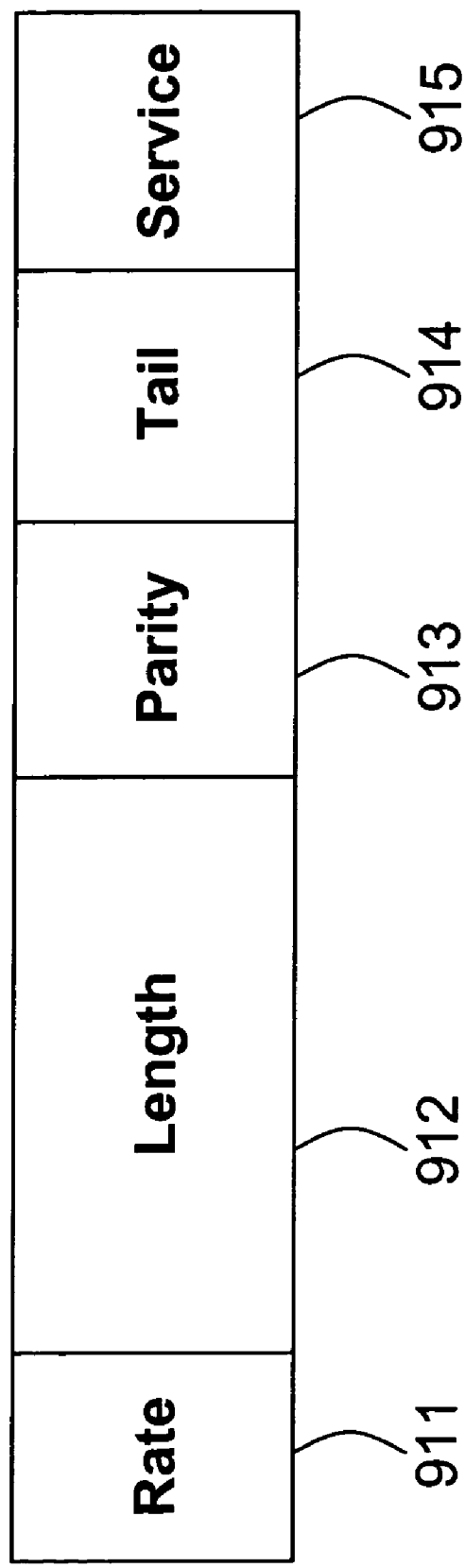
FIG. 9 is a detailed block diagram of the PCLP header field of FIG. 8.

FIG. 9 shows a format 900 for the header 812, which includes rate 911, parity 913, tail 914, and service 915 fields as defined in the IEEE 802.11a standard. A length field 912 indicates the length of the corresponding PSDU 813.

Figure 10:
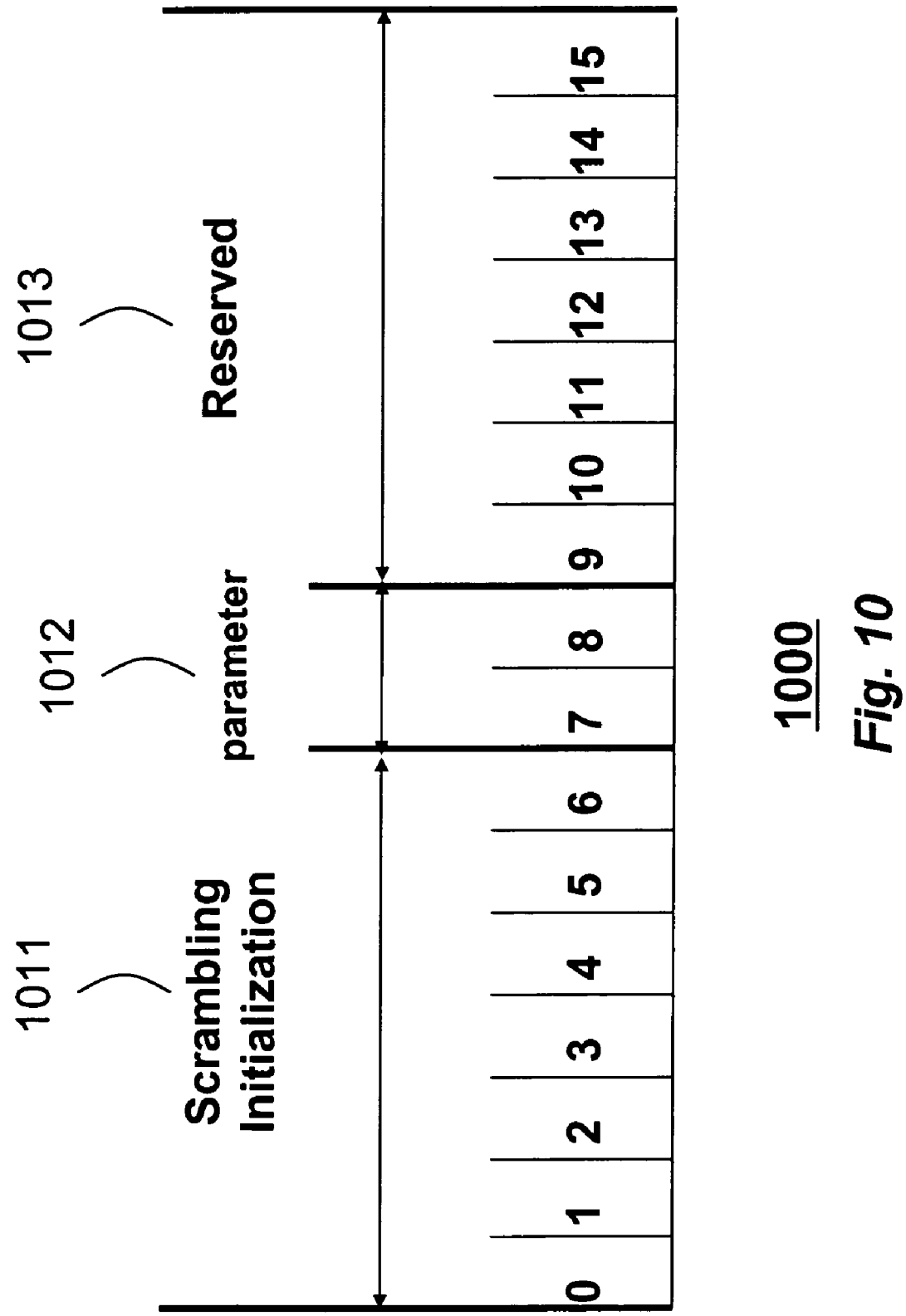
FIG. 10 is a detailed block diagram of a service field according to the invention.

FIG. 10 shows a format 1000 of the service field 915, which includes scrambling initialization 1011, parameter 1012, and reserved 1013 fields. According to the IEEE 802.11a standard, an initial state of a scrambler is set to a pseudo random non-zero state. All symbols belonging to a MAC frame are transmitted by using the same initial state for scrambling. The receiver descrambles in the same order.

Table A shows possible values for the parameter field 1012. The receiver uses the parameter field to determine the type of aggregation that is used in the current PSDU frame, and whether the following PSDU in the same PPDU has the same transmission rate as the current PSDU frame. This information can also indicate implicitly whether the OFDM symbol 801 delimits the current PSDU frame.

TABLE A

| Parameter | Explanation |
| --- | --- |
| 00 | Without level 2 aggregation |
| 01 | With level 2 aggregation. Both the current PSDU and the succeeding one have the same transmission rate. |
| 11 | With level 2 aggregation. Transmission rate needs to be changed after the current PSDU. |
| 10 | Reserved |

Acknowledgement Mechanism

As stated above, the last aggregated PSDU n 813 and the following PLCP header n+1 812, see FIG. 8, are used to implement the aggregate BlockACK request function.

Figure 11:
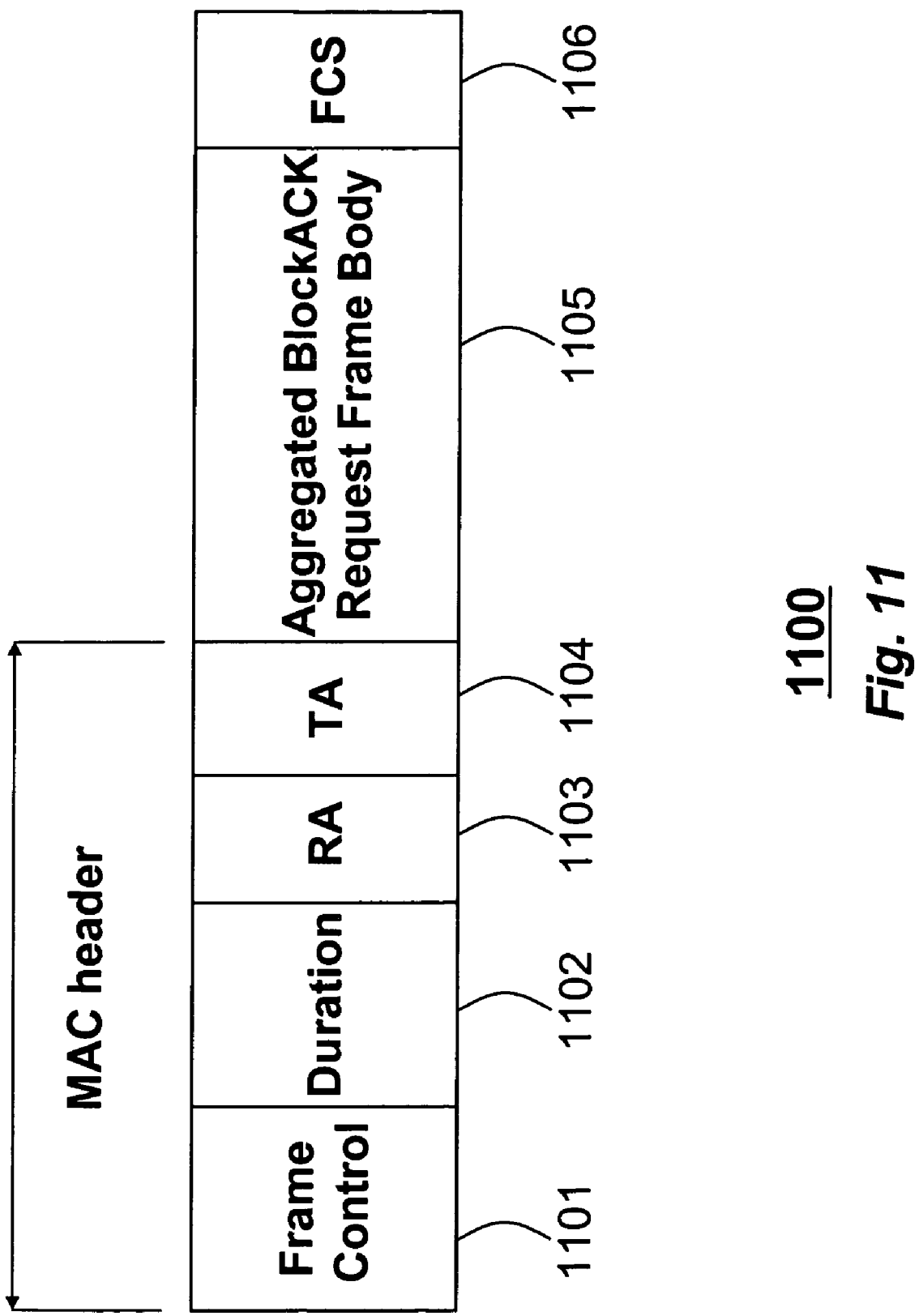
FIG. 11 is a detailed block diagram of an aggregate Block-ACK according to the invention.

FIG. 11 shows a format 1100 of the PSDU n+1, also known as aggregated BlockACK request), which includes frame control 1101, duration 1102, receiver address 1103, transmitter address 1104, aggregate BlockACK request frame body 1105, and FCS 1106 fields. The receiver address (RA) is set to a broadcast address so that every station in the network decodes the frame body 1105. Transmitter address (TA) is the transmitter's MAC address. Both the duration field 1102 and the FCS field 1106 apply to all the BlockACK request messages aggregated within the aggregated BlockACK Request frame body 1105.

Figure 12:
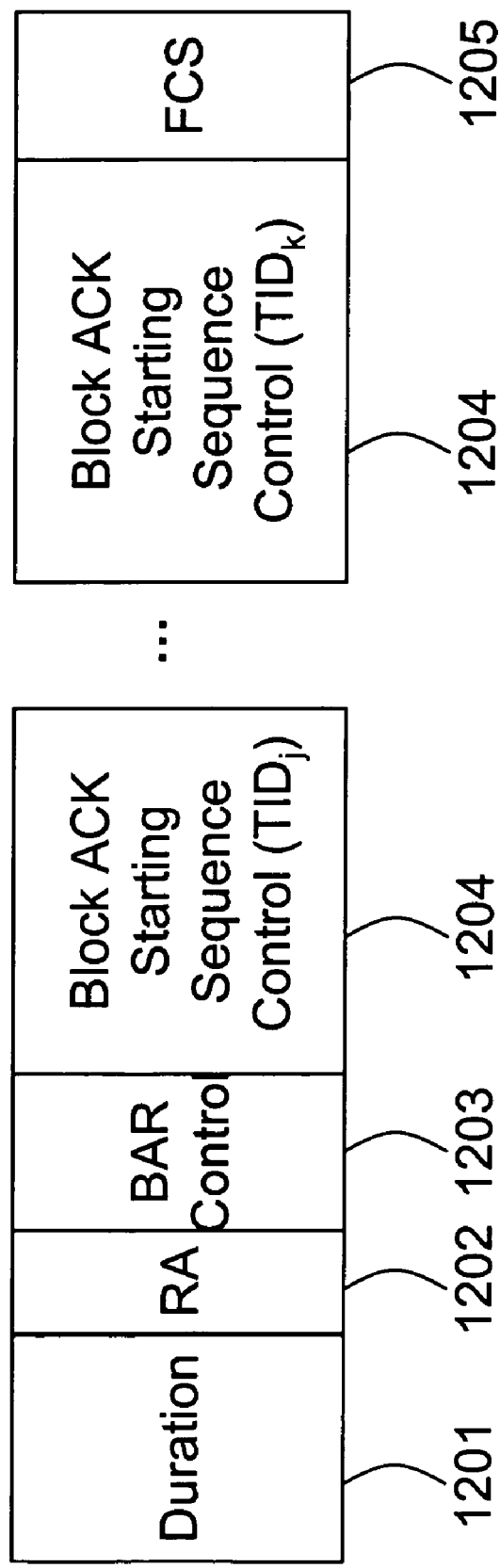
FIG. 12 is a block diagram of the frame body field within an aggregated BlockACK request according to the invention.

FIG. 12 shows a format 1200 of the aggregated BlockACK request frame body 1105. This information is transmitted at a basic transmission rate to guarantee reliable reception. The body 1200 includes at least one BlockACK request element including duration 1201, receiver address 1202, BAR controls 1203, BlockAck starting sequence controls (TID) 1204, and FCS 1205 fields. The duration field 1201 applies to an individual BlockACK request element. The receiver address (RA) 1202 is the MAC address of the receiving station. Each receiver station corresponds to one element in the aggregated BlockACK request frame body. One BlockACK request element can contain up to four BlockACK starting sequence numbers.

Figure 13:
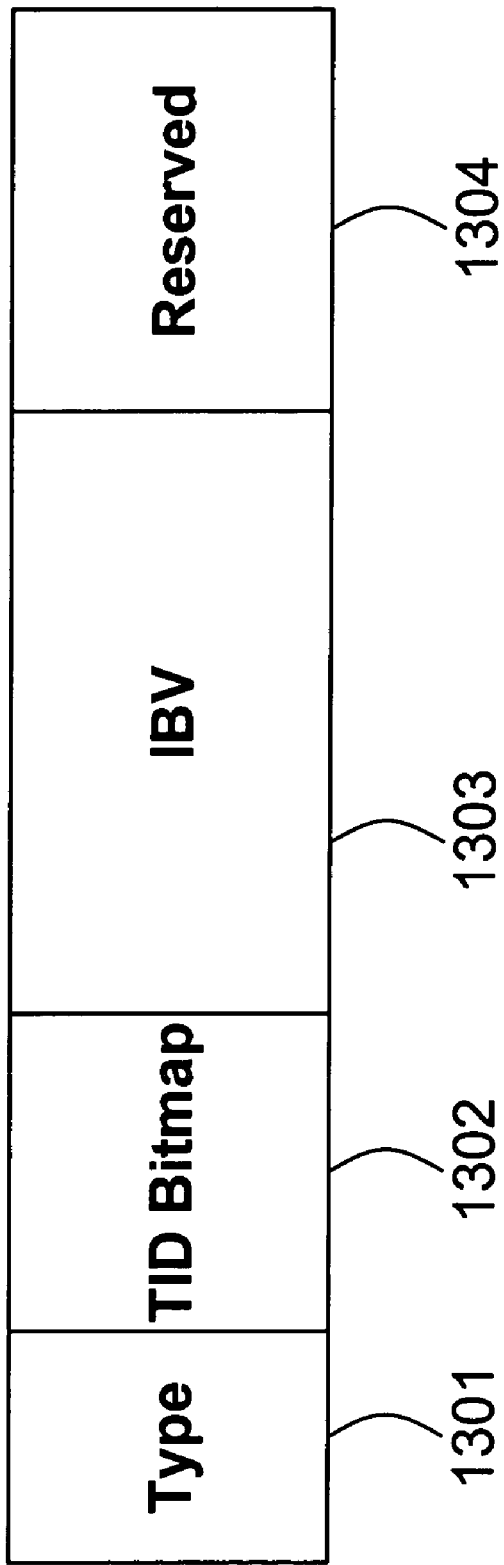
FIG. 13 is a block diagram of a BlockACK request (BAR) control field according to the invention.

FIG. 13 shows a format 1300 of the BlockACK request control field. The field includes type 1301, TID bitmap 1302, initial backoff value (IBV) 1303, and reserved 1304 fields. The type field 1301 indicates the type of the current BlockACK session. The possible values of the type field 1301 are shown in Table B.

TABLE B

| Type | Explanation |
| --- | --- |
| 00 | Conventional BlockACK |
| 01 | BlockACK for frame aggregation in contention period |
| 11 | BlockACK for frame aggregation in contention free period |
| 10 | Reserved |

The TID bitmap field 1302 has one bit for each of four possible sequence control fields 1204. For instance, if bit two is one, then the TID 0 of the transmitting station (TA) requests a BlockACK from the receiving station (RA) for a set of frames, the first one of which has the sequence control field as BlockACK Starting Sequence Control (TID0). The number of '1's in the TID Bitmap field is equal to the number of BlockACK starting sequence control fields contained in the BlockACK request element. With this information, the receiver can infer the length of the BlockACK request element. The IBV field 1303 indicates the number of backoff time slots to use before transmitting a BlockACK message, see FIG. 14.

Figure 14:
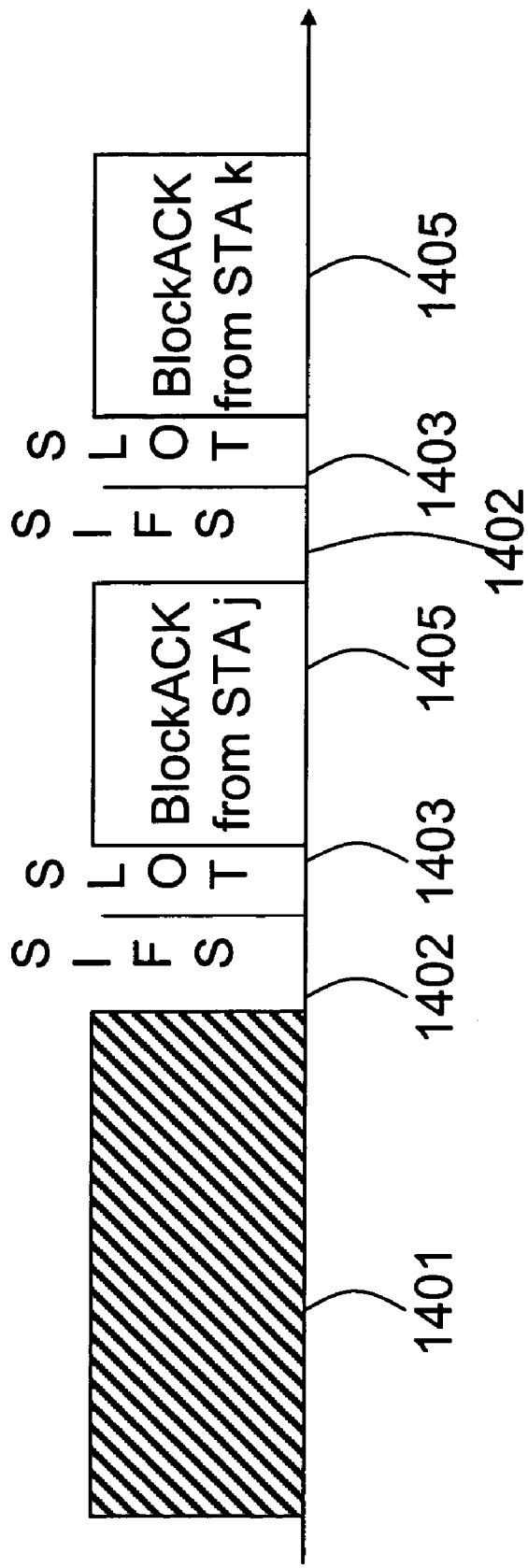
FIG. 14 is a timing diagram of block acknowledgement according to the invention.

FIG. 14 shows the timing for block acknowledgement. After receiving an aggregate frame 1401, a receiving station j replies with a BlockACK message 1405 when there is a BlockACK element in the last PSDU of the received aggregate frame. To transmit the BlockACK message, the station first sets the initial value of its backoff counter to the IBV 1303. Then, the receiving station backoffs for IBV number of slots 1403 before the station transmits the BlockACK message. For each BlockACK message, the station accesses the channel using a CSMA-like approach. Because the station starts the backoff at a SIFS time 1402 after receiving the frame 1401 when the channel becomes idle, the BlockACK message has the highest priority in contending for the channel, and no collision between BlockACK messages with other type of frames will occur. Moreover, all BlockACK messages due to the reception of PSDUs aggregated in the same PPDU are assigned a different number of backoff slots. Hence, potential collisions among these BlockACK messages are eliminated, and different receivers can acknowledge MSDUs contained in the same aggregate frame in a collision free manner.

Figure 15:
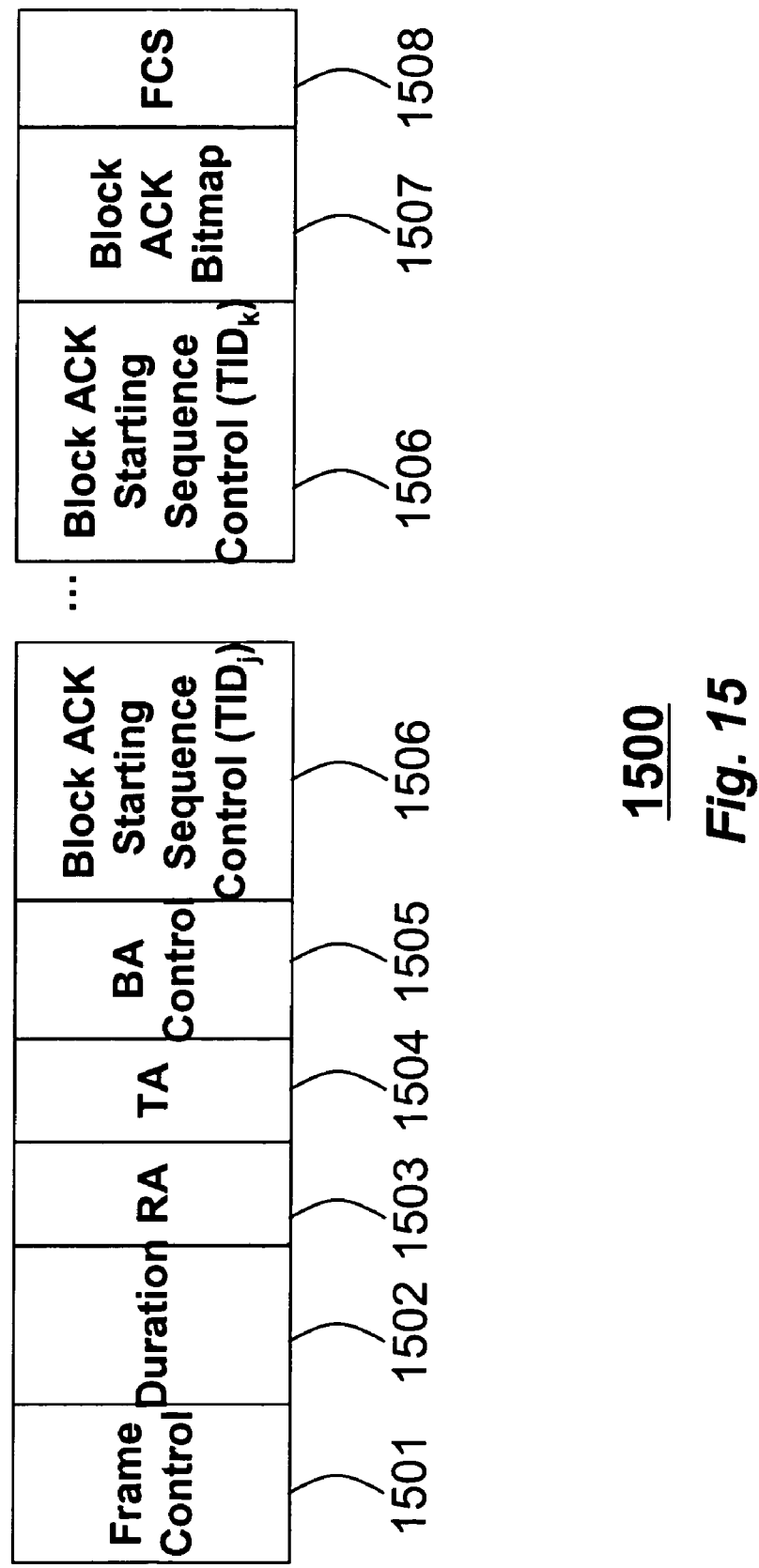
FIG. 15 is a block diagram of a BlockACK message according to the invention.

FIG. 15 shows a format 1500 of the BlockACK message 1405, which includes frame control 1501, duration 1502, RA 1503, TA 1504, BlockACK control (BA) 1505, BlockACK starting sequence control 1506, BlockACK bitmap 1507, and FCS 1508 fields. The fields are defined according to the IEEE 802.11e standard, except that acknowledgements to frames of multiple TIDs can be included in the single BlockACK message.

Figure 16:
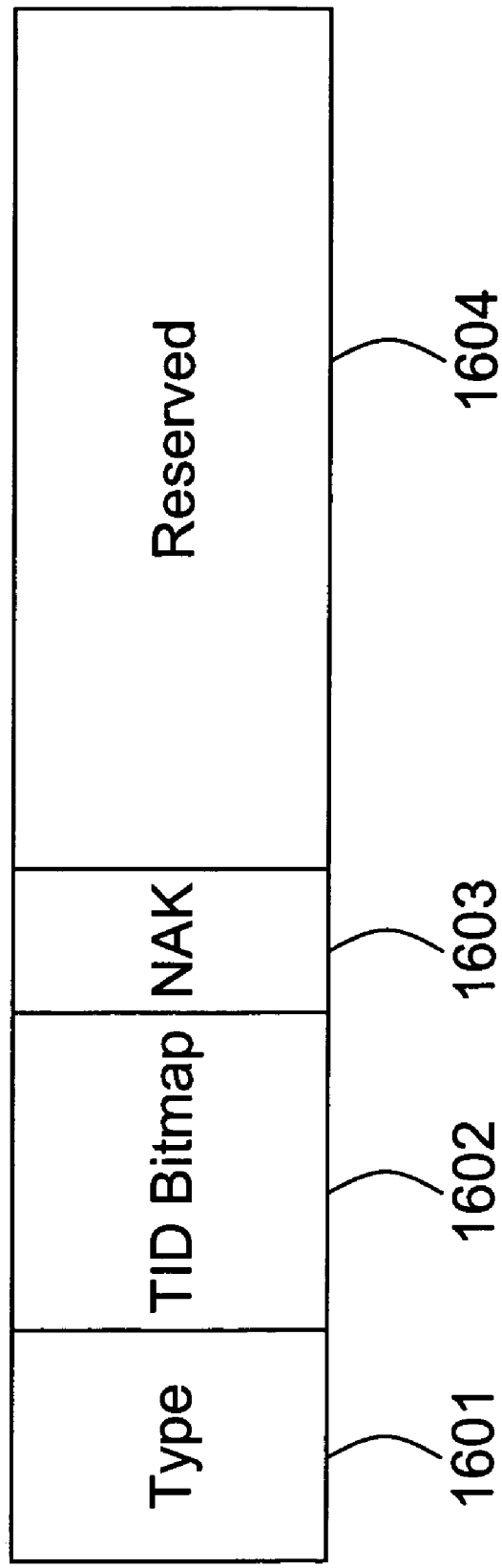
FIG. 16 is a block diagram of a BlockACK (BA) control field according to the invention.

FIG. 16 shows a format 1600 of the BlockACK (BA) control field 1505, which includes type 1601, TID bitmap 1602, NAK 1603, and reserved 1604 fields. The TID bitmap field 1602 is the same as that in the BlockACK request element. The NAK field 1603 indicates whether a positive or negative acknowledgement is used.

FIG. 17 shows a format 1700 of the BlockACK bitmap field 1507, which includes pairs of relative sequence number 1701 and encoded TID 1702 fields. Each relative sequence number (RSN) is determined in the following manner.

RSN=(Sequence number of *TID x*–Starting sequence number of *TID x*).

The encoded TID field 1702 is a binary expression of the TID associated with the frame of the relative sequence number. Because there are only four priorities in the contention period, two bits are sufficient.

Instead of including a fixed length BlockACK bitmap, either only the correct or only the incorrect frames can be acknowledges, whichever is less, see U.S. patent application Ser. No. 10/917,053, "Method for Acknowledging Data Packets in a Network," filed by Gu et al., on Aug. 12, 2004, incorporated herein by reference.

Aggregation Frame Size Adaptation

In a wireless network, conditions in a channel change rapidly, particularly if stations are mobile. If the quality of the channel degrades, then a large frame size can incur a higher probability of loss than a small frame. Therefore, it is desirable to have a frame size that can be adjusted dynamically to an instantaneous channel condition. In addition, the transmission rate can also be adapted to the instantaneous condition of the channel. Hence, the aggregation frame size adjustment should operate in conjunction with the rate adaptation scheme.

Contention Free Period

For a contention free period, e.g., HCCA, a parameterized channel access method is used. A transmission opportunity (TXOP) is assigned on a per traffic stream (TS) basis. If the TXOP allocated to a traffic stream at a specific time cannot be used completely, the TS forfeits the unfinished TXOP so that a next scheduled TS can start its TXOP. Therefore, aggregation of frames with different TIDs is inappropriate. Moreover, because each TS is mapped with a unique pair of source and destination addresses, the aggregation of frames with different destination addresses is also against the fundamental principle of parameterized traffic transmission. Therefore, frames are only aggregated at the MSDU level during the contention free period such as HCCA. However, in other contention free periods such as PCF of the IEEE 802.11 standard, the frames can be aggregated at both MSDU and PSDU level since PCF may transmitted multiple fames with different destinations in one polling action.

Figure 18:
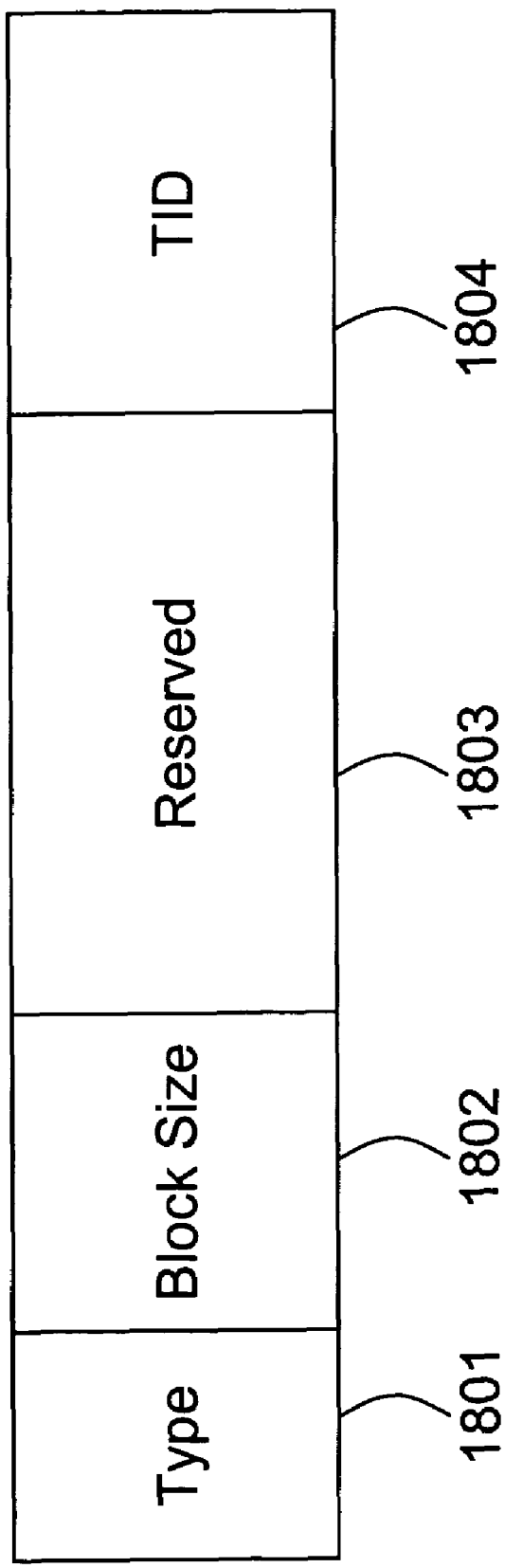
FIG. 18 is a block diagram of a BlockACK request frame according to the invention.

The MSDU aggregation in contention free period is also shown in FIGS. 4-7 for aggregation in the contention period. The BlockACK request and BlockACK messages described in the related patent application Ser. No. 10/917,053 can be used here. The format of the BlockACK request frame is as defined in the IEEE 802.11e standard, except that the BA field has the format 1800, as shown in FIG. 18, which includes type 1801, block size 1802, reserved 1803, and TID; 1804 fields. As described above, the type field 1801 indicates that the BlockACK is for frames aggregated in the contention free period. The block size field 1802 stores the number of frames that require acknowledgement. The TID field 1804 indicates the traffic stream associated with the BlockACK message.

Frame Aggregation Parameters

A transmitting station, which aggregates frames as described herein, checks the MPDU aggregation field 514 of the QoS control field 500 of the MAC header 410 to determine whether the receiving station is enabled to handle aggregate frames. This is done by transmitting an add aggregation level ½ (ADDAL) request frame, and receiving an ADDAL response frame. The receiving station has the option of accepting or rejecting the request. If the receiving station accepts the request, the stations can negotiate a maximum size of the frame aggregation. Table C shows possible action field values.

TABLE C

| Action Field Value | Meaning |
| --- | --- |
| 0 | ADDAL request |
| 1 | ADDAL response |
| 2-255 | Reserved |

The ADDAL request and ADDAL response have same frame format as described in Table D.

TABLE D

| Order | Meaning |
| --- | --- |
| 1 | Category |
| 2 | Action |
| 3 | Dialog token |
| 4 | Frame aggregation parameter set |

Figure 19:
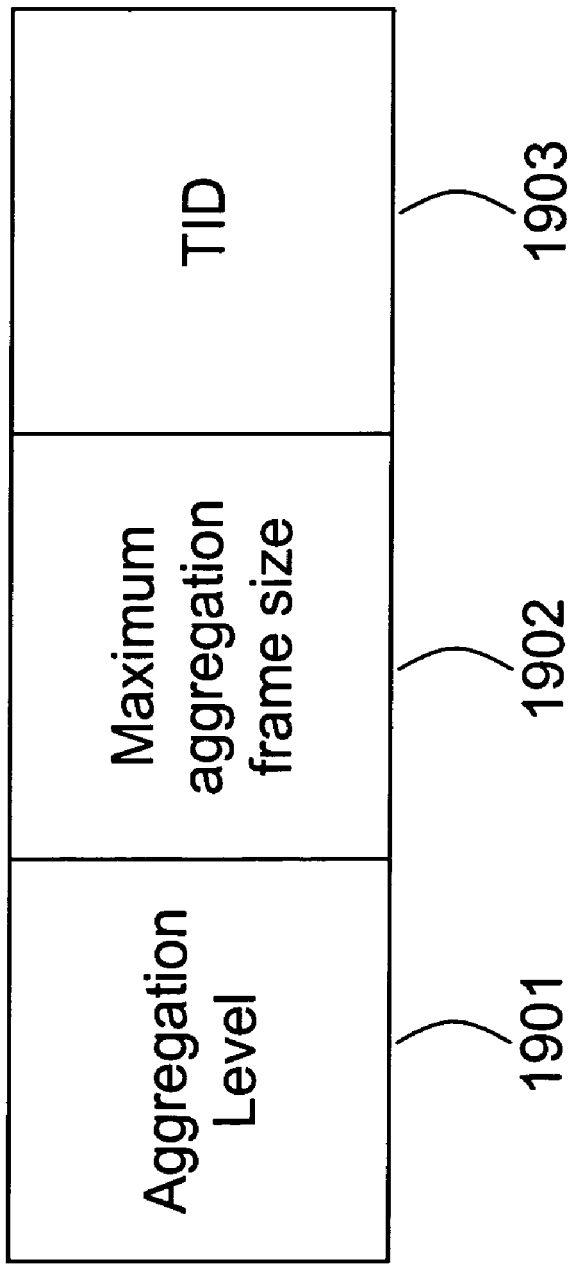
FIG. 19 is a block diagram of a frame aggregation parameter according to the invention.

The category field is set to four, which represents frame aggregation. The action field is set to 0 and 1 to indicate an ADDAL request or response, respectively. The dialog token field is set to a non-zero value selected by the station. The frame aggregation parameter is shown in FIG. 19, which includes aggregation level 1901, maximum frame size 1902, and TID 1903 fields.

The format of aggregation level field 1901 is shown in Table E.

TABLE E

| Bits | Meaning |
| --- | --- |
| 00 | No frame aggregation |
| 01 | Frame aggregation at MSDU level |
| 11 | Frame aggregation at PSDU level |
| 10 | Frame aggregation at MSDU and PSDU levels |

When the frame aggregation at the MSDU level is supported, the maximum aggregation frame size 1902 indicates the maximum size, which can be determined by either the transmitter or receiver, which ever is smaller. The TID field 1903 represents the TID, for which frame aggregation is negotiated.

System Structure

Transmitter

FIG. 20 shows a structure 2000 for frame aggregation at a transmitter. The structure includes the LLC 110, MAC 120, and PHY 130 layers. The MAC layer includes queues 2001 for prioritized traffic streams, and queues 2002 for parameterized traffic streams. Blocks 2010 and 2020 implement the MSDU and PSDU level aggregation as described herein, respectively in the MAC and PHY layers. Note that the MSDU aggregation is done on a per queue basis, while the PSDU aggregation is done concurrently for all queues with different TIDs.

After the MSDU frames are received at MAC layer 120 from the LLC layer 110, the frames are stored in the queues 2001-2002 according to priorities and traffic classes. During the contention period, channel access starts immediately, after a frame becomes the head of line (HOL) in the corresponding queue. After success in channel contention, the MSDU aggregation scans the queues to locate all the frames with the same destination addresses, which are then aggregated into one single MPDU, with proper headers and trailers attached to the frame.

Note that the total size of the aggregate frame at the MSDU level is subject to the limit set aside by the corresponding TXOP, current physical channel condition and the maximum frame size limit imposed by physical layer. The PSDU aggregation is invoked by a successful channel contention event. The PSDU aggregation 2020 first requests the MSDU aggregation 2010 to check the 'winning' queue, and collect all the frames with the same TID but different destinations.

If internal collision occurs, then the PSDU aggregation unit 2020 communicates with the MSDU unit 2010 associated with those queues, which are of lower priority and are involved in the internal collision. These units are requested to retrieve the head of line (HOL) frames from the corresponding queues. It is also under the discretion of the MSDU unit whether to perform aggregation or not on these retrieved frames. Finally, the PSDU unit appends the PLCP header for each collected MPDU frame and passes the aggregate frame to lower functional blocks for modulation and transmission. For contention free period, only the MSDU unit is applied to the frames in the queues with identical traffic class and destination addresses.

Receiver

Figure 21:
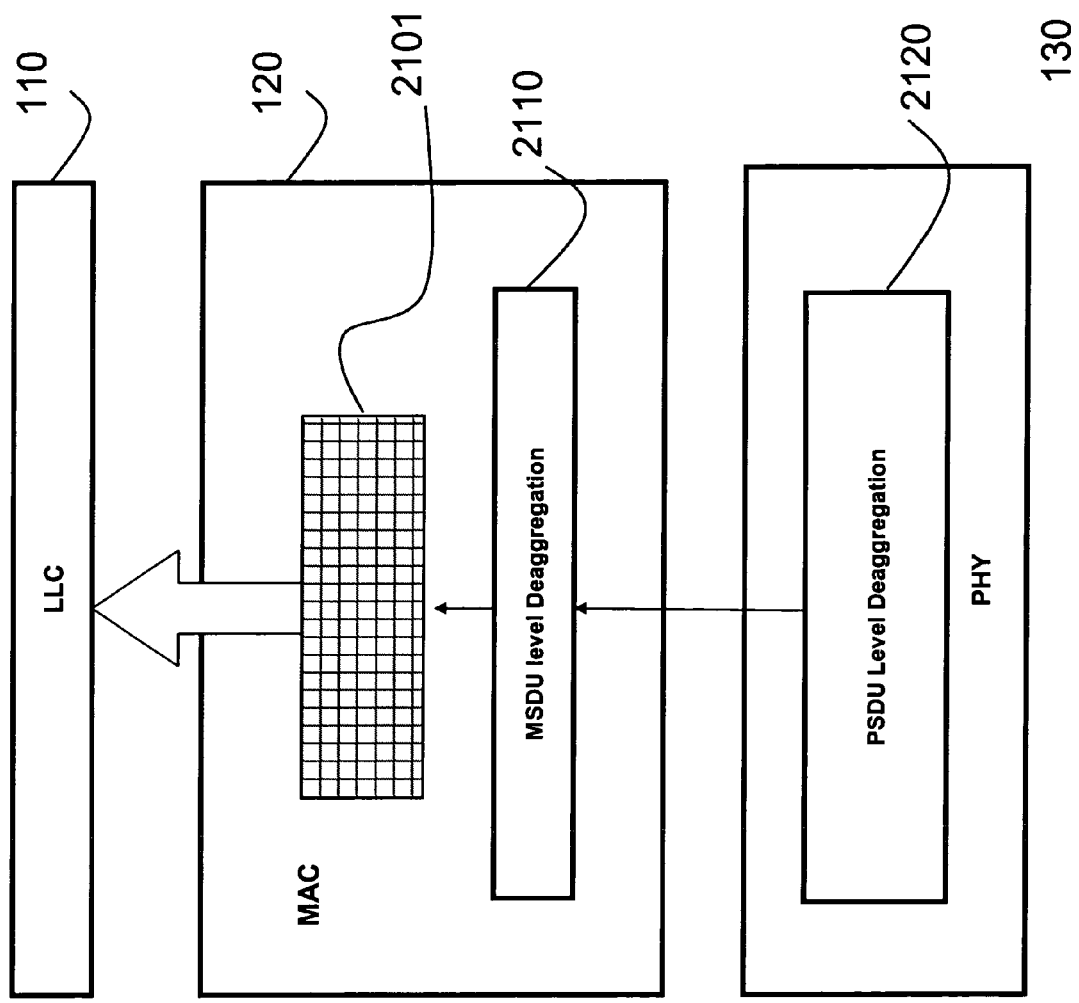
FIG. 21 is a block diagram of a receiving station according to the invention.

FIG. 21 shows the structure 2100 of the receiver. In this case, units 2110 and 2120 perform the MSDU and PSDU deaggregation, respectively. The PSDU deaggregation unit 2120 removes the PLCP header and passes the MPDU frame to the MSDU deaggregation unit 2110, which removes the MAC header and trailer and temporarily store the MSDU frames of all priorities in a shared memory 2101, from which the LLC layer 110 retrieves the frame for further processing.

EFFECT OF THE INVENTION

The invention enables large bandwidth communications on high-speed wireless local area networks (WLANs). The invention provides an efficient and flexible frame aggregation method and system for high throughput WLANs. Frames can be aggregated at both the MSDU level and the PSDU level so that the overhead associated with prior art frame transmission is reduced significantly when the invention is applied. The invention is compatible with networks designed according to the IEEE 802.11 standard. The invention works for frame transmission during the contention period, e.g., EDCA, ADCA, and the contention free period, e.g., HCCA, SCCA. The invention can be applied to networks operating in either the infrastructure mode or the ad hoc mode, and other networks, such as networks designed according to the IEEE 802.15.3 standard.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for aggregating frames to be transmitted over a channel in a wireless network, comprising:
   receiving from a logical link layer in a transmitting station a plurality of MSDU frames in a media access control layer;
   aggregating selected MSDU frames having identical destination addresses and identical traffic classes into a single aggregate MPDU frame;
   receiving from the media access control layer in the transmitter a plurality of the aggregate MPDU frames as PSDU frames in a physical layer;
   aggregating selected PSDU frames with different destination addresses and different traffic classes into a single aggregate PPDU frame in the physical layer; and
   transmitting the single aggregate PPDU frame on the channel of the wireless communication network.

2. The method of claim 1, in which the aggregation of the MSDU frames is during a contention period.

3. The method of claim 1, in which the aggregation of the MSDU frames is during a contention free period.

4. The method of claim 1, in which the aggregation of the PSDU at the physical layer frames is during a contention period.

5. The method of claim 1, in which the aggregate MPDU frame includes the MSDU frames having the identical destination address and the identical traffic class.

6. The method of claim 5, in which the MSDU frames are in a form of MSDU triplets, each MSDU triplet including a MSDU header, one of the MSDU frames, and a FCS for the MSDU frame.

7. The method of claim 1, further comprising:
   transmitting the selected PSDU frames of the aggregate PSDU frames at different rates.

8. The method of claim 7, further comprising:
   inserting an OFDM symbol between the selected PSDU frames having different rates.

9. The method of claim 1, further comprising:
   acknowledging the single aggregate PSDU frame with a single acknowledgement message.

10. The method of claim 1, further comprising:
    acknowledging the single aggregated PSDU frame with a BlockAck message.

11. The method of claim 1, further comprising:
    acknowledging the single aggregated PSDU frame with a BlockAck message.

12. The method of claim 1, in which a size of the single aggregate MSDU is adapted according to an instantaneous condition of the channel.

13. The method of claim 1, in which a size of the single aggregate MSDU is adapted dynamically to a rate of transmission.

14. The method of claim 1, in which the plurality of MSDU frames are stored in a plurality of queues, and the aggregation of the MSDU frames is done on a per queue basis.

15. The method of claim 1, further comprising:
    acknowledging the selected PSDU frames with the different destination addresses in a collision free manner.

16. The method of claim 1, further comprising:
    aggregating the selected PSDU frames with the different destination addresses and the different traffic classes when the selected PSDU frames are subject to an internal collision in the transmitting station.

17. A system for aggregating frames to be transmitted over a channel in a wireless network, comprising:
    a transmitter, the transmitter further comprising:
        a media access control layer configured to receive a plurality of MSDU frames from a logical link layer of the transmitter;
        means for aggregating selected MSDU frames having identical destination addresses and identical traffic classes into a single aggregate MPDU frame; and
        a physical layer configured to receive, from the media access control layer in the transmitter, a plurality of the aggregate MPDU frames as PSDU frames in a physical layer, the physical layer further comprising:

means for aggregating selected PSDU frames with different destination addresses and different traffic classes into a single aggregate PPDU frame in the physical layer; and means for transmitting the single aggregate PPDU frame on the channel of the wireless communications network.

* * * * *